United States Patent [19]

Fasen

[11] Patent Number: 4,609,860
[45] Date of Patent: Sep. 2, 1986

[54] BATTERY CHARGER HAVING AUTOMATIC DEEP DISCHARGE MODE

[75] Inventor: Kenneth R. Fasen, Lake In The Hills, Ill.

[73] Assignee: James P. Liautaud, Cary, Ill.

[21] Appl. No.: 529,860

[22] Filed: Sep. 6, 1983

[51] Int. Cl.$^4$ .............................................. H02J 7/00
[52] U.S. Cl. ...................................... 320/14; 320/39; 320/48
[58] Field of Search .................. 320/13, 14, 39, 40, 320/5, 48

[56] References Cited

U.S. PATENT DOCUMENTS

| 3,603,861 | 9/1971 | Staats et al. | 320/14 |
| 4,270,080 | 5/1981 | Kostecki | 320/39 X |
| 4,302,714 | 11/1981 | Yefsky | 320/14 X |

*Primary Examiner*—R. J. Hickey
*Attorney, Agent, or Firm*—Lockwood, Alex, FitzGibbon & Cummings

[57] ABSTRACT

A battery charger for recharging nickel cadmium batteries includes trickle charge, fast charge and deep charge modes. A control circuit responsive to the terminal voltage of the battery includes a clock-driven mode control counter having counter states which condition power supply circuitry within the charger to the mode appropriate to the battery terminal voltage. The counter is conditioned to its deep discharge state by actuation of a user-accessible switch. When the terminal voltage falls below a first predetermined level, the counter automatically reverts from the discharge state to its fast charge state to establish the fast charge mode. When the terminal voltage rises above a second predetermined level, the counter automatically reverts to its trickle charge state to establish the trickle charge mode.

4 Claims, 4 Drawing Figures

BATTERY CHARGER HAVING AUTOMATIC DEEP DISCHARGE MODE

BACKGROUND OF THE INVENTION

The present invention is directed generally to battery chargers, and more specifically to a battery charger having automatic trickle charge, fast charge and discharge modes.

Portable electronic devices such as two-way radios, receivers, recorders and test equipment, which may see frequent use over an extended period of time, typically utilize rechargeable batteries which can be recharged after use, thereby avoiding the expense and inconvenience of installing new batteries.

Typically, the batteries of the devices are contained within a removable battery pack. During operation the battery pack is installed in the device. When the batteries become depleted, the battery pack is removed and inserted into a charger, which contains all necessary power supply and control circuitry for bringing the batteries of the battery pack up to full charge. Preferably, the recharging procedure takes place initially at a fast charge rate, and then at a trickle charge rate, and is entirely automatic, requiring no attention or control input by the operator.

One type of rechargeable battery which has proven particularly attractive for this purpose is the nickel cadmium-type battery. This battery combines high current capacity with long shelf life, and is relatively economical to manufacture. Unfortunately, such nickel cadmium batteries are subject to "memory effect", wherein they quickly become depleted in use, notwithstanding having been recently brought up to full charge. It has been determined that this effect is caused by repetitive shallow discharges and sustained overcharge periods, and can be avoided by subjecting the batteries to a deep discharge prior to charging.

The present invention is directed to a battery charger which accomplishes the necessary pre-charge deep discharge, as well as the subsequent conventional fast charge and trickle charge, completely automatically and without input from the operator.

Accordingly, it is a general object of the present invention to provide a new and improved battery charger.

It is a further object of the present invention to provide a battery charger which is fully automatic and requires no monitoring or input from the operator.

It is a further object of the present invention to provide a battery charger which includes discharge, fast charge and trickle charge modes automatically as required by the condition of the battery.

It is a further object of the present invention to provide a battery charger which provides an operator-initiated deep discharge mode which automatically reverts to fast charge and trickle charge modes in accordance with the terminal voltage of the battery.

SUMMARY OF THE INVENTION

Accordingly, the invention is directed to a battery charger for applying a charging current to a rechargeable battery. The charger includes fast charging means for applying a relatively high charging current to the battery, and trickle charging means for applying a relatively low trickle charging current to the battery. Charge control means responsive to the terminal voltage of the battery terminate application of the fast charge current and initiate application of the trickle charge current upon the battery voltage rising above a first predetermined reference level, and terminate application of charge current and discharge the battery in response to an applied user-initiated control command, the discharge being terminated upon the battery voltage reaching a second predetermined reference level.

The invention is further directed to a battery charger for supplying a charging current to a battery, and having fast charging means for applying a relatively high charging current, and trickle charging means for applying a relatively low trickle charging current, wherein charge control means are provided which include a counter having enabling outputs connected to the fast and trickle charge means, and which is responsive to the terminal voltage of the battery for advancing from a first counting state to a second counting state to initiate operation of the fast charging means upon the terminal voltage falling below the predetermined minimum level.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
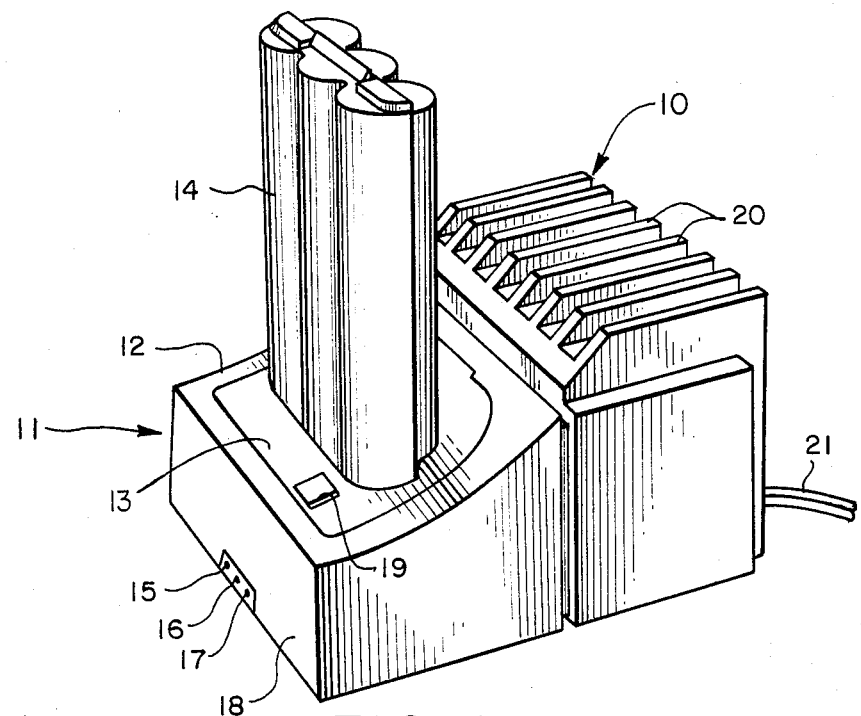
FIG. 1 is a perspective view of a battery charger incorporating a battery charging circuit constructed in accordance with the invention and showing the installation of a battery pack therein.

Referring to the drawings, and particularly to FIG. 1, a battery charger 10 incorporating a battery charging circuit in accordance with the invention is shown contained within a housing 11 of generally rectangular construction and formed of a hard heat-dissipating material, such as aluminum. The housing 11 may include a forwardly and downwardly sloped panel 12 on which an insert assembly 13 is provided for receiving a removable battery pack 14. The housing may be as described in the copending application of James P. Liautaud et al, entitled "Battery Charger", U.S. Ser. No. 529,709, filed concurrently herewith. The battery pack receptacle 13 may be as described in the copending application of James P. Liautaud et al, entitled "Battery Charging Adapter for a Battery Charger for a Portable Battery Operated Transceiver", U.S. Ser. No. 529,859, filed concurrently herewith. The battery pack 14 may be as described in the copending application of James P. Liautaud et al, entitled "Housing for a Portable Battery-Operated Device", U.S. Ser. No. 530,050, filed concurrently herewith. When battery pack 14 is installed in receptacle 13, the battery pack is positioned generally vertically as shown, facilitating convenient installation and removal from the charger. The operating mode of the charger is indicated by LED indicators 15–17 located on a vertical panel 18 of housing 11. A user-actuable push button 19 provides for initiation of a deep discharge mode in a manner to be described subsequently.

A plurality of fins 20 on the top and rear surfaces of housing 11 are provided to improve heat dissipation from the charger when in use. A line cord 21 may be provided to connect the charger to a conventional alternating current source.

Figure 2:
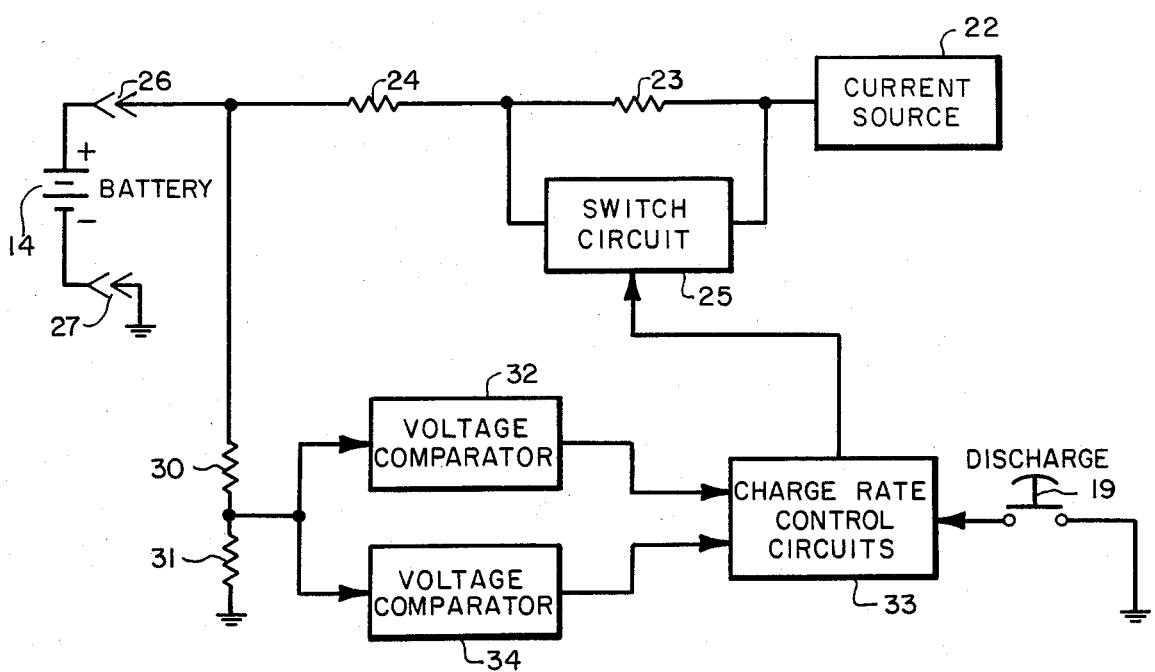
FIG. 2 is a simplified functional block diagram of the battery charging circuit of the invention.

Basically, as shown in FIG. 2, within battery charger 10 current is supplied to battery pack 14 by a unidirectional current source 22. The output of this current source is applied to battery 14 through a pair of series-connected resistors 23 and 24. A switch circuit 25 is connected in shunt with resistor 23 to enable that component to be effectively removed from the series circuit by establishing a low impedance circuit around the resistor. A pair of contacts 26 and 27 establish electrical contact with battery pack 14 and allow the battery pack to be removed as required.

Battery voltage is sensed by a voltage divider comprising a pair of resistors 30 and 31 connected between the positive terminal of the battery and ground. The juncture of these resistors is connected to a first voltage comparator 32, which compares the battery voltage with a first predetermined reference voltage. If the battery voltage is less than this reference voltage, an output signal is applied to a charge rate control circuit 33 to change the operating mode of the battery charger from a trickle rate to a fast charging rate.

The battery terminal voltage derived at the juncture of resistors 30 and 31 is also applied to a second voltage comparator 33, which functions to compare the battery terminal voltage against a second reference voltage level. In the event that the battery voltage is lower than the second reference level, an output signal is applied to charge rate control circuit 33 to condition that circuit from a discharge mode through a fast rate mode, in a manner to be described.

Charge rate control circuit 33 is initially conditioned to a discharge mode by the push button switch 19, which provides an appropriate control signal to the control circuit. Depending on the operating mode called for by charge rate control circuit 33, an output from this circuit is applied to switch circuit 25 such that resistor 23 is short-circuited when battery conditions call for a fast charge mode. In the event that a trickle charge mode is required, switch circuit 25 is conditioned non-conductive, effectively returning resistor 23 to the charging circuit and reducing the current accordingly. Resistor 24 is in the circuit at all times to limit the maximum charging current under the fast charge mode.

Figure 3:
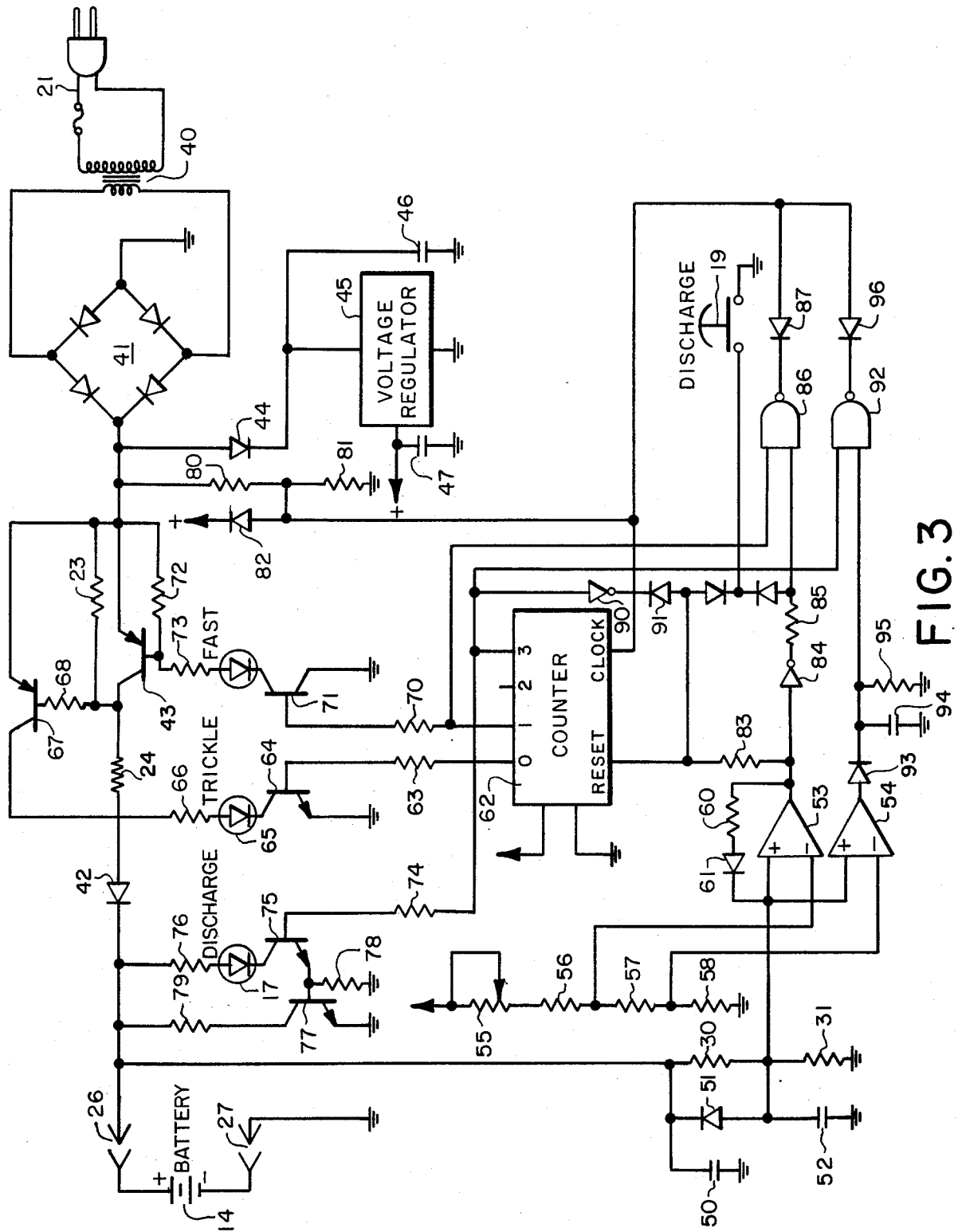
FIG. 3 is a simplified schematic diagram of the battery charging circuit.

Thus, battery charger 10 is automatically conditioned to the appropriate one of its trickle charge, fast charge and discharge modes by charge rate control circuit 33 in accordance with the comparisons effected by comparators 32 and 34 and the input provided by switch 19. The construction and functioning of charge rate control circuit 33 and its associated circuits is shown in greater detail in FIG. 3. As shown in this Figure, pulsating direct current for charging battery 14 is provided by a transformer 40 and associated bridge rectifier 41. The negative output terminal of bridge rectifier 41 is ground, and the positive output terminal is connected to battery 14 through resistor 23, resistor 24 and a diode 42. A transistor 43 connected in shunt with resistor 23 provides for short-circuiting resistor 23 in the fast charging mode. The output of bridge rectifier 41 is also connected through a diode 44 to a voltage regulator 45, which provides voltage-regulated direct current for the control circuits of the battery charger. A pair of capacitors 46 and 47 filter the input and output of voltage regulator 45, respectively.

The terminal voltage of battery 14 is sensed by the voltage divider formed by resistors 30 and 31. A capacitor 50 connects between the positive terminal of the battery and ground provides filtering for the applied charging currents. A diode 51 connected across resistor 30, and a capacitor 52 connected across resistor 31 provide true battery terminal voltage at the juncture of the resistors by eliminating the periodic half-cycle voltage increases produced at battery 14 by the pulsating alternating current developed by bridge rectifier 41. This terminal voltage is applied to the non-inverting input of a first comparator 53 and to the non-inverting input of a second comparator 54. Reference voltages are developed for the inverting inputs of the comparators by a voltage divider comprising the potentiometer 55 and a trio of series-connected resistors 56–58. The inverting input of comparator 53 is connected to the juncture of resistors 56 and 57, and the inverting input of comparator 54 is connected to the juncture of resistors 57 and 58. Potentiometer 55 is shunt-connected so as to simultaneously adjust the two reference voltages.

By reason of resistors 30 and 31 a portion of the batter terminal voltage is applied to the non-inverting inputs of comparators 53 and 54. The portion actually applied is dependent on the ratio between resistors 30 and 31. For example, should the resistors be of equal resistance, one-half of the battery terminal voltage appears at the non-inverting inputs.

The reference voltage supplied to the inverting input of comparator 53 establishes a first predetermined reference level above which the comparator produces an output signal. This reference level is set to take into account the voltage division provided by resistors 30 and 31. For example, if resistors 30 and 31 are of equal resistance and one-half the battery terminal voltage is applied to the comparators, then the reference voltages applied to the comparators are set at one-half of the desired reference levels. A resistor 60 and a diode 61 connected between the output of comparator 53 and the non-inverting input of the device provide a hysteresis effect with respect to transitions between below reference and above reference inputs.

Similarly, comparator 54 develops an output signal upon the applied portion of the battery terminal voltage exceeding a second predetermined reference level established at the juncture of resistors 57 and 58.

In accordance with one aspect of the invention, the operating mode of the battery charger is established by a mode control counter 62. This counter sequentially counts through four counting states 0–3, providing corresponding logic output signals on a respective one of four similarly designated output terminals.

The zero output is connected through a resistor 63 to the base of a transistor 64. The emitter of transistor 64 is grounded and the collector is connected through an LED 65 and Series Register 66 to the collector of a transistor 67. The emitter of transistor 67 is connected to one terminal of resistor 23, and the base is connected through a resistor 68 to the other terminal of resistor 23.

Consequently, when counter 62 is in its zero counting state, transistor 64 is rendered conductive. This enables current to be supplied to the LED by transistor 67 provided that device is rendered conductive by current flow through resistor 23. Thus, with battery pack 14 in place, trickle current flowing through resistor 23 (transistor 43 being non-conductive) biases transistor 67 into conduction and causes LED 15 to light, indicating operation of the battery charger in its trickle mode.

When counter 62 is in its one counting state an output is provided through a resistor 70 to the base of a transistor 71. This causes the transistor to become conductive, establishing a series circuit through a pair of series-connected resistors 72 and 73 and LED 16 between the output of bridge rectifier 41 and ground. Consequently, transistor 43 is biased into conduction, effectively short-circuiting resistor 23 and allowing the application of a greater high charge rate current to battery 14.

Although counter 62 provides an output in its "two" counting state, this output is not utilized for control of the battery charger. Instead, the presence of this intermediate counting state provides a desired delay in transition between the one and "three" counting states of the counter, thereby providing, in accordance with another aspect of the invention, a desired delay between fast, charge and discharge operating modes.

The "three" counting state output of counter 62 is applied through a resistor 74 to the base of a transistor 75. The collector of this transistor is connected through LED 17 and a resistor 76 to the positive terminal of battery 14. The emitter of transistor 75 is connected to the base of a transistor 77 and to ground by a resistor 78. The collector of transistor 77 is connected to a positive terminal of battery by a resistor 79 and the emitter of the transistor is connected to ground.

With this arrangement, when counter 62 is in its "three" counting state transistor 75 is biased into conduction, causing LED 17 to light signalling operation of the battery charger in its discharge mode. At the same time, transistor 77 is biased into conduction, causing battery 14 to be discharged through resistor 79. Thus, in the "three" counting state battery 14 is discharged at a rate determined by the resistance of resistor 79.

Counter 62 is caused to sequentially count through its "zero", "one", "two" and "three" countings states by pulses applied to its clock input. These pulses are derived from the pulsating direct current output of bridge rectifier 41 by means of serially-connected resistors 80 and 81 connected between the output of the bridge rectifier and ground. The diode 82 connected between the juncture of resistors 80 and 81 and the regulated voltage source provided by voltage regulator 45 provides operating bias. Since the unidirectional pulses developed by bridge rectifier 41 occur at twice the 60 hertz line frequency, counter 62 is clocked at a 120 hertz rate. Operating power is supplied to counter 62 in a conventional manner by connections to the regulated output of voltage regulator 45 and to ground.

In accordance with another aspect of the invention, automatic control of the counting state of counter 62, and hence the operating mode of the battery charger, is provided by comparators 53 and 54 and the user-actuated discharge switch 19. In particular, when the terminal voltage of battery 14 is above the first predetermined reference level established at comparator 53, the comparator produces an output signal which is applied to the reset terminal of counter 62 through a resistor 83. This resets the counter to its "zero" counting state providing a control signal to transistor 64 which causes the trickle mode-indicating LED 15 to light with the passage of charging current to battery 14 through resistor 23. The output of comparator 53 is also applied through an inverter 84 and a resistor 85 to one input of a NAND gate 86. The inverted output of comparator 53 inhibits the NAND gate, preventing the gate from providing a control output.

Should the battery terminal voltage fall below the reference level established by comparator 53, the comparator produces a logic low output, which results in the application of a logic high input to NAND gate 86. This removes the logic high reset signal from counter 62, allowing the counter to advance to its "one" counting state by reason of the 120 hertz stepping pulses applied to its clock input.

After the counter has advanced to the next counting state, the "one" output of the counter biases transistors 71 and 43 into conduction, causing the current-limiting resistor 23 to be bypassed and a higher charging current to be applied to battery 14. At the same time, the logic high output of counter 62 is applied to the remaining input of NAND gate 86 enabling that device. The output of NAND gate 86 is applied through a diode 87 to the clock pulse line, preventing the application of further clock pulses to counter 62 for so long as the battery voltage continues to be less than the reference voltage established at comparator 53.

When the battery voltage rises above the first predetermined reference level established at comparator 53, the comparator provides a logic high signal which when inverted by inverter 84 inhibits NAND gate 86. This enables stepping pulses to again be applied to counter 62, causing the counter to advance. At the same time, the output of comparator 53 is applied to the reset input of the counter, causing the counter to return to and remain in a "zero" counting state. This results in trickle mode operation. To initiate a discharge cycle, it is necessary for the operator to momentarily depress the discharge switch 19. This simultaneously inhibits NAND gate 86, preventing that device from interrupting the application of clock pulses to the clock input of counter 62. At the same time, the reset terminal of counter 62 is grounded, preventing the application of a reset signal to the counter by comparator 53. Consequently, the counter is caused to advance to its "three" counting state, and the battery 14 is discharged through transistor 77 and resistor 79. When counter 62 is in its "three" state, the counter output is applied through an inverter 90 and a diode 91 to the reset terminal, inhibiting the reset function even after the discharge switch 19 has been released. At the same time, the "three" output is applied to one input of a NAND gate 92, causing the gate to be enabled when the counter is in its "three" state. The output of comparator 54 is applied to the remaining input of NAND gate 92 through a diode 93. A delay circuit comprising a capacitor 94 and a resistor 95 are provided at this remaining input to produce a short time delay for the production of an output signal from NAND gate 92 following an output from comparator 54. Upon the battery voltage applied to comparator 54 exceeding the second predetermined reference voltage, comparator 54 produces an output which is applied through diode 93 after a short delay to NAND gate 92. This causes the NAND gate to produce an output through a diode 96 which is connected to the clock input of counter 62 so as to prevent the application of clock pulses.

With this arrangement, counter 62 remains in its "three" counting state until the battery voltage falls below the reference level established by comparator 54, causing the comparator to produce a logic low output signal. This inhibits NAND gate 92 and allows the application of further clock pulses to counter 62 to advance the counter to its "zero" counting state. Since no output is presented at the "one" output of counter 62 at this time, NAND gate 86 is inhibited and cannot function to prevent the application of clock pulses to the counter.

The use of counter 62 greatly simplifies the control circuit for selecting the operating mode of the battery charger. By providing a source of clock pulses to the counter, and inhibiting the stepping of the counter by means of voltage comparators associated with the battery, the invention achieves precision control of the battery charging process with minimal complication in circuitry.

Figure 4:
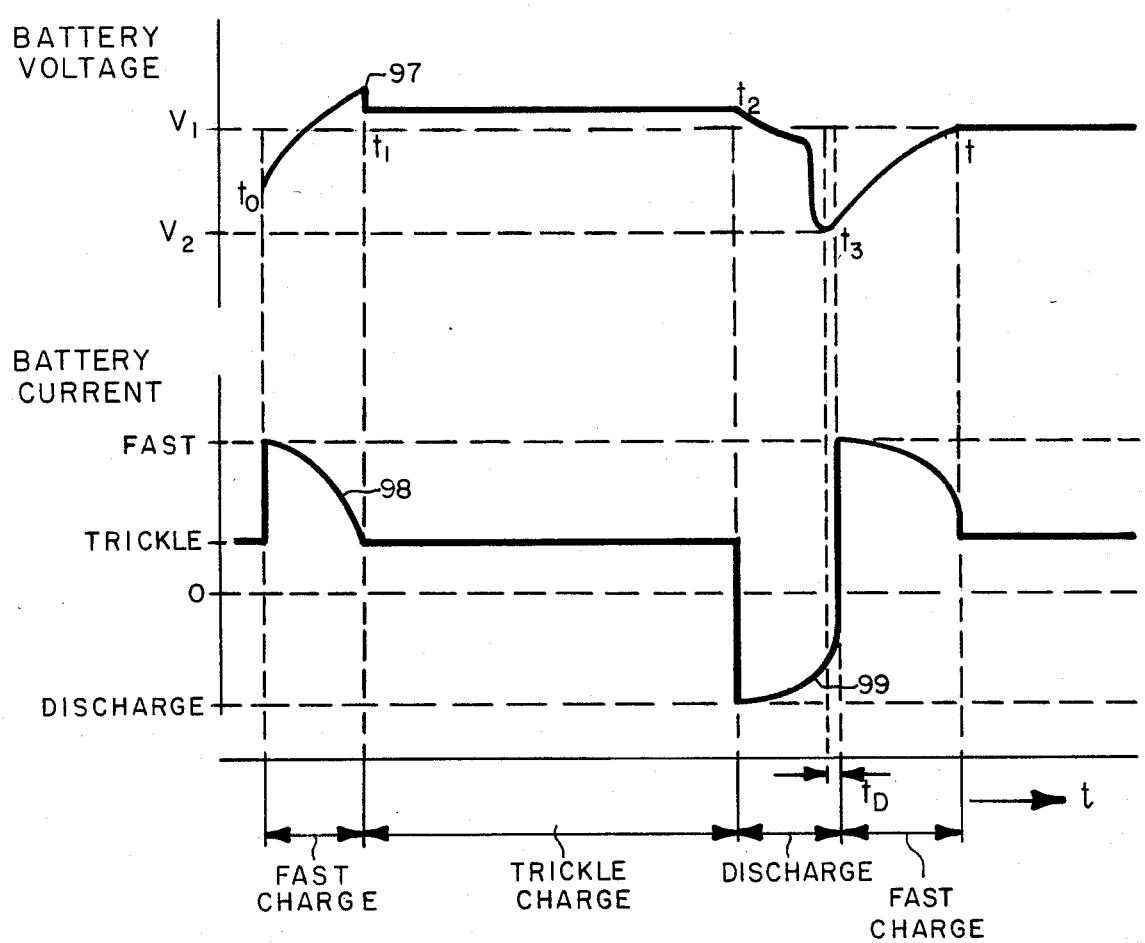
FIG. 4 is a depiction of certain waveforms useful in understanding the operation of the battery charging circuit.

The operation of the charging circuit is illustrated in FIG. 4. There, plot 97 illustrates the battery voltage, and its characteristic voltage increase during fast charge cycle and its slow decay during trickle charge cycles. Plot 98 shows the effect of operation of the circuit of the invention on battery current. For periods of discharge it is seen that a battery current is negative and the battery is discharged to a voltage approaching the minimal threshold voltage established by comparator 92.

It will be appreciated that in practice battery may be substantially totally discharged upon initial installation in the battery charger. In this instance, it is contemplated that the charger will operate at a fast charge rate until the battery terminal voltage has risen to the first predetermined level. At this time, the fast charge rate is terminated and a trickle charge into the battery is established. This trickle charge may continue until a full charge is again required.

Should it be desired to accomplish a deep discharge procedure, button 19 is pressed and battery current is quickly discharged, as shown in FIG. 4. After the battery terminal voltage has reached the second minimum threshold level, a fast charge rate is terminated and a trickle charge is commenced.

It will be appreciated that the battery charger circuit of the invention can be used in conjunction with various types of housings. Also, while the circuit has been shown in conjunction with a nickel cadmium battery, it will be appreciated that with appropriate modifications to the reference levels the circuit can be utilized in conjunction with other types of batteries.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A battery charger for supplying current to a rechargable battery comprising:

a counter having at least first, second, third and fourth counting states occurring repetitively in sequence in response to applied clock pulses, said counter remaining in said first counting state in response to an applied reset signal, and providing first, second and third charge control signals indicative of said first second and fourth counting states, respectively;

battery charging circuit means responsive to said charge control signals for supplying current to the battery, said current comprising a relatively low trickle charge current in the presence of said first charge control signal, a relatively larger fast charge current in the presence of said second charge contol signal, and a deep discharge current in the presence of said third charge control signal;

battery voltage sensing means responsive to the terminal voltage of the battery for providing a first mode control signal in response to said battery voltage exceeding a first predetermined reference level, and a second mode control signal in response to said battery voltage falling below a second predeermined reference level;

a source of continuous clock pulses for advancing said counter progressively through said first, second, third and fourth counting states;

circuit means responsive to said first mode control signal for applying a reset signal to said counter to maintain said counter in said first counting state when said battery voltage exceeds said first predetermined reference level, and for applying said clock pulses to said counter to advance said counter from said first to said second counting state when said battery voltage falls below said first predetermined reference level; and a user actuated switch;

circuit means for applying said clock pulses to said counter to advance said counter to said fourth counting state upon actuation of said user-actuated switch, and for maintaining said counter in said fourth counting state concurrently with said battery voltage remaining above said second predetermined reference level; and circuit means responsive to said second mode control signal for applying said clock pulses to said counter to advance said counter from said fourth counting state upon said battery voltage falling below said second predetermined reference level.

2. A battery charger as defined in claim 1 wherein said battery voltage sensing means comprise a first voltage comparator for developing said first mode control signal, and a second voltage comparator for developing said mode control signal.

3. A battery charger as defined in claim 1 wherein said user-actuated switch comprises a momentary-contact switch.

4. A battery charger as defined in claim 1 wherein the battery charger is operable from an alternating current line, and said clock pulses are derived from the alternating voltage thereof.

* * * * *